United States Patent
Mast

(10) Patent No.: US 9,598,240 B2
(45) Date of Patent: Mar. 21, 2017

(54) CONVEYOR DEVICE FOR TRANSPORTING GOODS

(71) Applicant: J. Schmalz GmbH, Glatten (DE)

(72) Inventor: Jonas Mast, Baiersbronn (DE)

(73) Assignee: J.SCHMALZ GmbH, Glatten (DE)

( * ) Notice: Subject to any disclaimer, the term of this patent is extended or adjusted under 35 U.S.C. 154(b) by 0 days.

(21) Appl. No.: 15/132,743

(22) Filed: Apr. 19, 2016

(65) Prior Publication Data
US 2016/0311623 A1   Oct. 27, 2016

(30) Foreign Application Priority Data
Apr. 21, 2015 (DE) .................. 10 2015 207 217

(51) Int. Cl.
| | |
|---|---|
| *B65G 15/26* | (2006.01) |
| *B65G 41/00* | (2006.01) |
| *B65G 21/14* | (2006.01) |
| *B65G 15/12* | (2006.01) |
| *B65G 37/00* | (2006.01) |
| *B65G 15/50* | (2006.01) |

(52) U.S. Cl.
CPC ............. *B65G 21/14* (2013.01); *B65G 15/12* (2013.01); *B65G 15/26* (2013.01); *B65G 37/005* (2013.01); *B65G 15/50* (2013.01); *B65G 2207/30* (2013.01)

(58) Field of Classification Search
CPC ................................ B65G 15/26; B65G 41/00
USPC ....................... 198/812; 193/35 TE
See application file for complete search history.

(56) References Cited

U.S. PATENT DOCUMENTS

| | | | | |
|---|---|---|---|---|
| 2,576,217 A | * | 11/1951 | Eggleston ............... | B65G 21/14 198/313 |
| 2,815,849 A | * | 12/1957 | Zumbrunnen ......... | B65G 21/14 193/35 TE |
| 3,584,731 A | * | 6/1971 | Dahlem ................. | B65G 21/14 198/303 |
| 3,596,785 A | * | 8/1971 | Weatherford, Jr. .... | B65G 21/14 198/313 |
| 3,651,963 A | * | 3/1972 | McWilliams .......... | B65G 67/08 198/318 |

(Continued)

FOREIGN PATENT DOCUMENTS

| | | |
|---|---|---|
| CN | 103723476 A | 4/2014 |
| DE | 1916831 | 10/1970 |

(Continued)

OTHER PUBLICATIONS

CN103723476A English Language Abstract (1 page).
JPS5819704A English Language Abstract.
KR 20080065757A English Language Abstract.

*Primary Examiner* — Douglas Hess
(74) *Attorney, Agent, or Firm* — Ware, Fressola, Maguire & Barber LLP

(57) ABSTRACT

A conveyor device (10) for the transport of goods, comprising individual modules (12) which form in their entirety a conveyor line (14) and each have a belt (20) circulating between a start section (16) of the module (12) and an end section (18) of the module (12), is configured and modified in regard to a reliable conveyance, including that of small objects in particular, such that the modules (12) are coupled together and able to swivel against each other so that the conveyor line (14) is adjustable in length by swiveling of the modules (12).

18 Claims, 4 Drawing Sheets

(56) References Cited

U.S. PATENT DOCUMENTS

| | | | | | |
|---|---|---|---|---|---|
| 4,260,053 | A | * | 4/1981 | Onodera | B65G 17/064 198/792 |
| 4,279,555 | A | * | 7/1981 | Rydell | B65G 57/112 198/382 |
| 4,643,299 | A | * | 2/1987 | Calundan | B65G 21/14 198/812 |
| 5,020,659 | A | | 6/1991 | Hodlewsky | |
| 5,147,025 | A | * | 9/1992 | Flippo | B65G 13/07 193/35 TE |
| 5,181,600 | A | * | 1/1993 | Chappell | B65G 21/14 198/309 |
| 5,224,584 | A | * | 7/1993 | Best | B65G 13/07 193/35 TE |
| 5,490,592 | A | * | 2/1996 | Best | B65G 13/12 198/812 |
| 5,632,371 | A | | 5/1997 | Best et al. | |
| 5,636,728 | A | * | 6/1997 | Best | B65G 13/12 193/35 TE |
| 5,642,803 | A | * | 7/1997 | Tanaka | B65G 1/1378 198/535 |
| 5,697,451 | A | * | 12/1997 | Nicholson | A01D 17/06 171/133 |
| 6,056,252 | A | * | 5/2000 | Johannsen | B65G 21/14 198/812 |
| 6,068,111 | A | * | 5/2000 | Smith | B65G 13/12 193/35 TE |
| 6,698,580 | B2 | * | 3/2004 | Diego | B65G 13/12 193/35 TE |
| 6,851,539 | B2 | * | 2/2005 | Flippo | B65G 13/12 193/35 TE |
| 6,935,487 | B2 | * | 8/2005 | Schaum | B65G 21/14 198/588 |
| 7,347,418 | B2 | * | 3/2008 | Speller | B65H 5/24 198/581 |
| 7,370,753 | B2 | * | 5/2008 | Yang | B65G 21/14 193/35 TE |
| 7,823,715 | B2 | * | 11/2010 | Kinnunen | B65G 21/14 193/35 TE |
| 8,262,334 | B2 | * | 9/2012 | Christensen | B64F 1/32 198/471.1 |
| 8,833,539 | B2 | * | 9/2014 | Fehr | B65G 21/14 198/313 |
| 2004/0089522 | A1 | | 5/2004 | Shaum | |

FOREIGN PATENT DOCUMENTS

| | | |
|---|---|---|
| DE | 3434768 | 5/1985 |
| DE | 10134602 | 2/2003 |
| EP | 2354049 A1 | 8/2011 |
| IE | 202008011613 | 4/2010 |
| JP | 58197104 | 11/1983 |
| KR | 1020080065757 | 7/2008 |
| WO | 2012074390 A1 | 6/2012 |

* cited by examiner

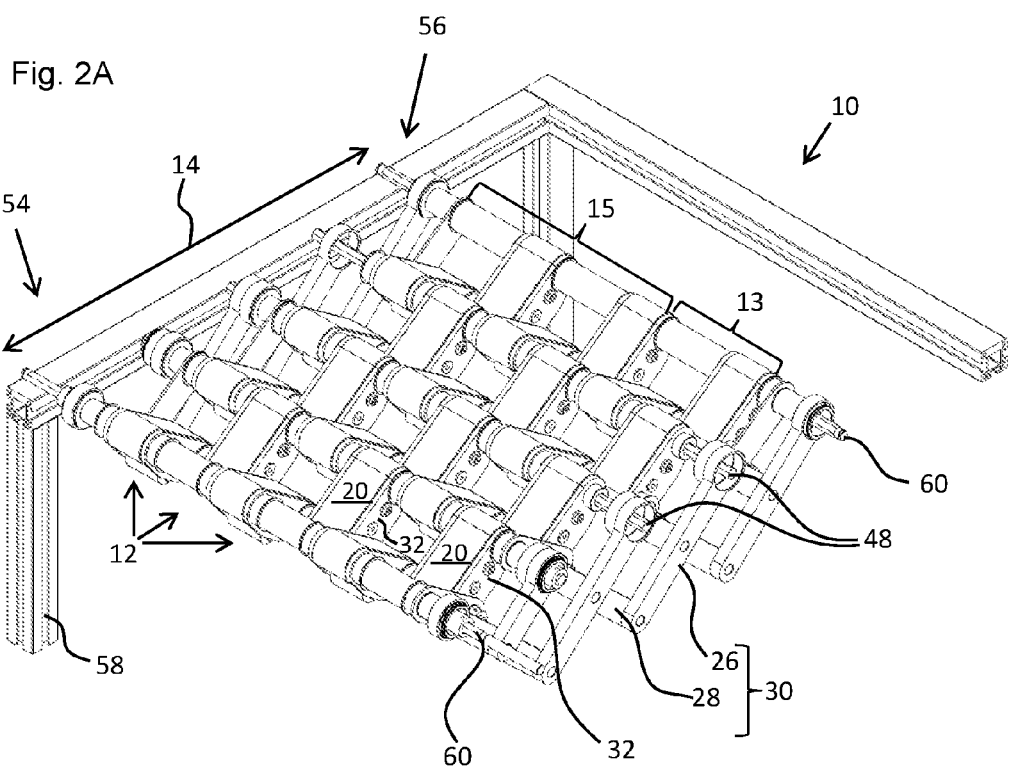
Fig. 2A
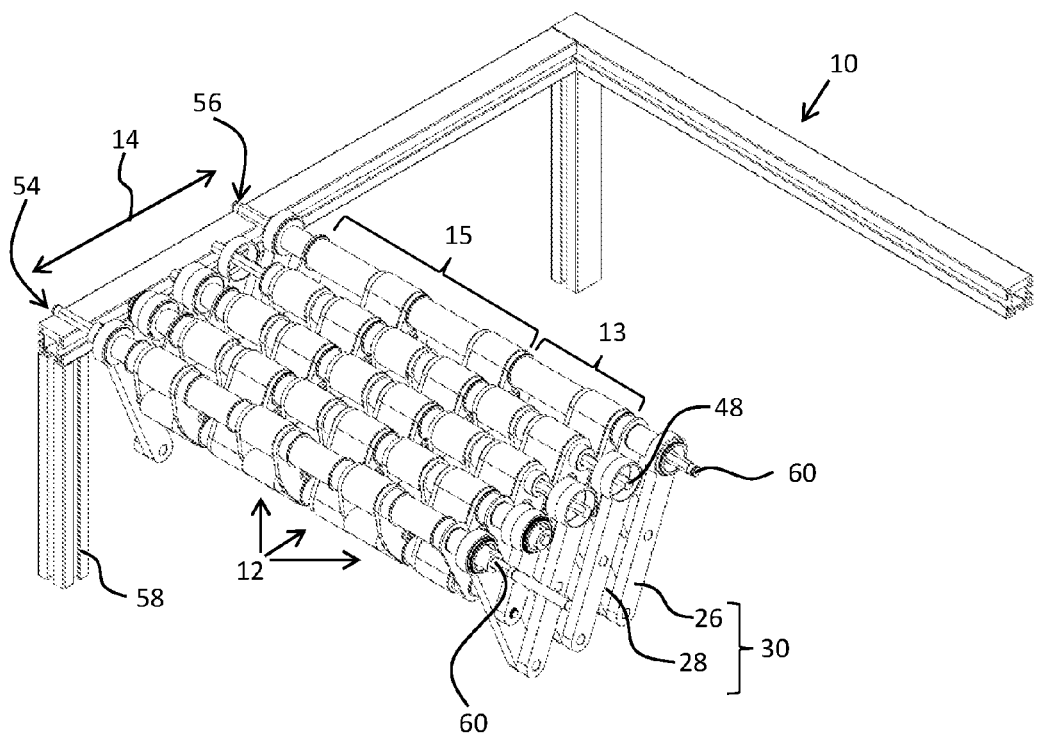
Fig. 2B
Figure 2

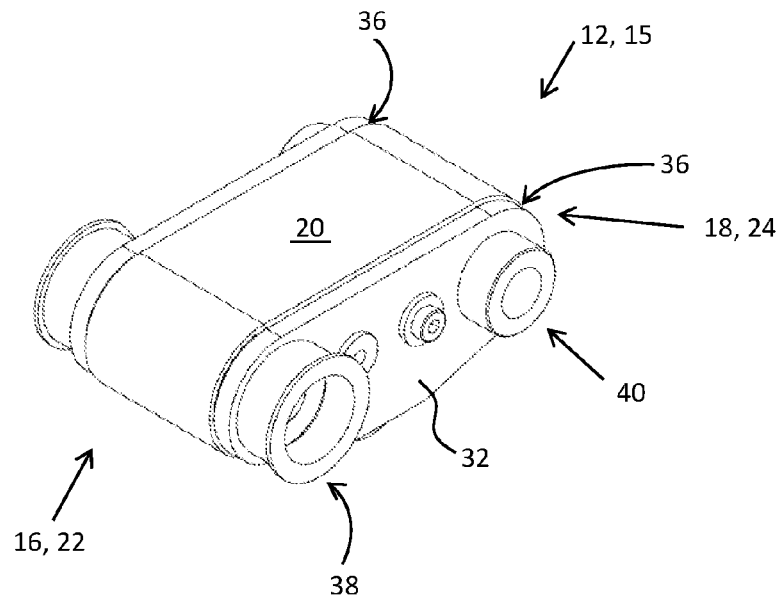
Fig. 3A
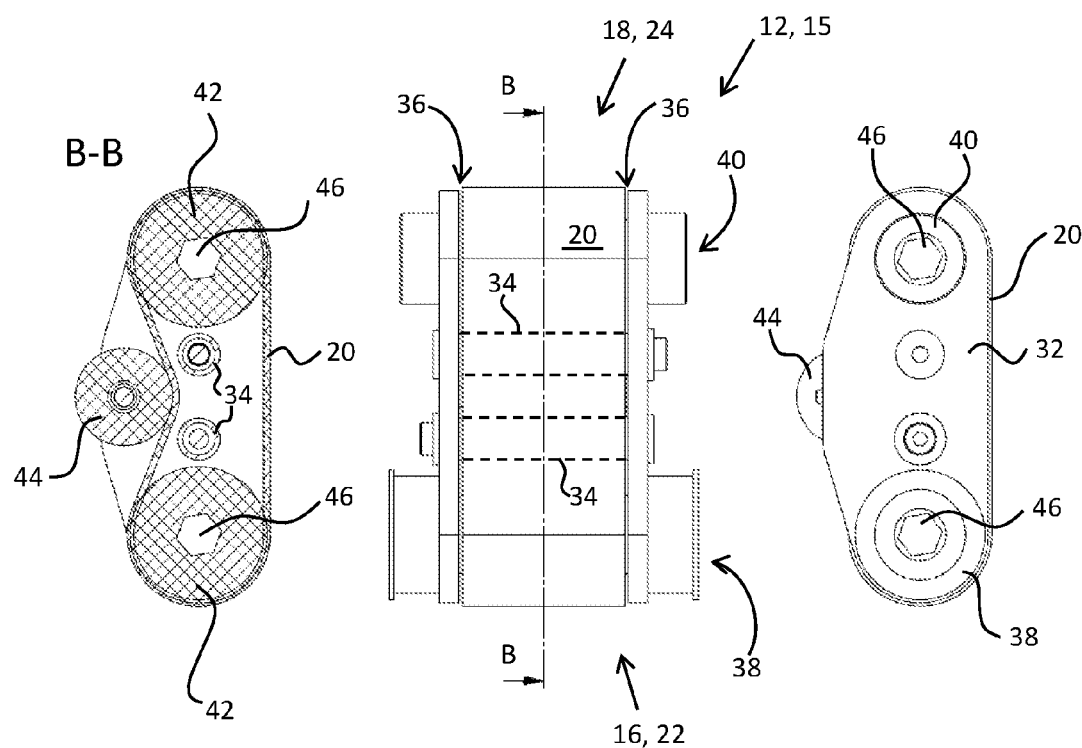
Fig. 3C   Fig. 3B   Fig. 3D
Figure 3

CONVEYOR DEVICE FOR TRANSPORTING GOODS

BACKGROUND OF INVENTION

1. Field of the Invention

The present invention concerns a conveyor device for the transport of goods, comprising individual modules which form in their entirety a conveyor line and each have a belt circulating between a start section of the module and an end section of the module.

2. Brief Description of Related Art

In the prior art there are known, for example, roll trains with driven rolls, in which small or flat objects can get in between the rolls. Moreover, telescopic conveyor belts are known with sections which can be shifted relative to each other, in which small or flat objects have a tendency to get in between the spaces existing between the sections.

The problem which the invention proposes to solve is to make possible a reliable conveyance, especially for small objects as well, in a conveyor device.

SUMMARY OF THE INVENTION

The problem is solved by a conveyor device for the transport of goods, comprising individual modules (12) which form in their entirety a conveyor line (14) and each have a belt (20) circulating between a start section (16) of a respective module (12) and an end section (18) of the respective module (12). Accordingly, the conveyor device is characterized in that the modules are coupled together and able to swivel against each other so that the conveyor line is adjustable in length by swiveling of the modules.

Because of the swiveling connected modules, gaps extending in the lengthwise direction of the conveyor line can be prevented, such as may occur for example in telescopic conveyor belts with sections displaced relative to each other. An unwanted dropping off or jamming of the conveyed goods is largely prevented in this way. Furthermore, thanks to this design with low structural height, a high retraction and extension ratio can be achieved, i.e., a large ratio between maximum extended length and full retracted length of the conveyor line. Thanks to the modular design with individual modules, the conveyor line can be easily adapted to give conveyance jobs. Height levels can also be overcome. The swivel axis of the coupled modules extends in particular orthogonally to the lengthwise dimension of the individual modules and/or the conveyor line.

In advantageous manner, several modules within the conveyor line can be coupled together in chain fashion along the conveyor line. Thanks to the chainlike coupling, the modules can swivel in space-saving fashion, which contributes to a high retraction and extension ratio of the conveyor line. The chainlike arrangement can be such that every end section of a module is coupled in pivoting manner to a start section of another module, especially a neighboring one.

Advisedly, the modules can swivel out from a plane of the conveyor line, especially a plane formed by the conveyor line. In particular, this shall be taken to mean that each time the neighboring or directly interconnected modules can be bent relative to each other. In this way, an especially short length of the conveyor line can be achieved in the retracted state.

The circulating belt in particular can run around a deflection in the start section and a deflection in the end section. In this way, the module is largely or completely covered by the belt in the lengthwise direction. Each module taken by itself thus forms a miniaturized conveyor belt or a miniaturized belt conveyor.

Advisedly, the modules, especially rows of modules or module rows, can be pivoted together by means of scissor elements. In this way, length adjustability of the conveyor line can be achieved with simple structural means. The scissor elements can swivel manually, so that the conveyor line can be lengthened manually. Alternatively, a drive unit acting for example in the lengthwise direction of the conveyor line can be provided for the length adjustment of the conveyor line. The totality of the scissor elements can also be called a scissor beam.

In advantageous manner, the modules can be enclosed at the side by side cheeks. This protects the module against an unwanted pulling in of foreign objects. Since the side cheeks enclose the circulating belt at its middle, these can furthermore prevent a sideways loosening of the belt. The side walls can be spaced apart from each other by means of sleeves, which are coupled for example by screw connections to the side cheeks. To enable a low friction running, the spacing of the side cheeks is designed so that each time an air gap remains between belt and one side cheek.

Advisedly, several modules can be ranged alongside each other transversely to the lengthwise dimension of the conveyor line, while the modules can be staggered in the lengthwise direction of the conveyor line. In this way, the conveyor line can be adapted to the conveyance requirements. Specifically, the conveyor line comprises at least four modules, which are arranged staggered in two consecutive rows along the conveyor line.

For the making of a swivel connection between the modules, the modules can have at least on one side of an end a bush-shaped receptacle and at the other end a barrel-shaped insert element corresponding to the bush-shaped receptacle. This creates a structurally simple swivel axis of low weight between the modules, while the dimensioning of the receptacle and insert element along the swivel axis at the same time also enables an adapting of the spacing of the modules. For the configuring of the deflections, the modules can have two deflecting rollers each time, around which the belt is led. This achieves a low-friction running. Furthermore, it is of advantage for the modules to have each time a tension roller arranged between the deflecting rollers, by which the belt can be tightened on each module.

In advantageous manner, the deflecting rollers can each have a passageway through which a shaft is inserted, engaging the passageway in form fitting manner. In this way, modules ranged alongside each other in the lengthwise direction of the conveyor line can be drive-coupled, so that the deflecting rollers and thus for the most part also the belts rotate in synchronization.

For a favorable drive unit, some of the modules can be configured as active modules for the driving of downstream modules in the conveyor line. In this way, drive power is relayed from driven modules or a row of driven modules by means of the active modules to upstream or downstream modules in the conveyor line. This has the advantage that a drive propulsion is needed only at one module or one row of modules at any desired location of the conveyor line. Furthermore, passive modules can be present, which are arranged for example in a module row next to active modules and which are driven by the shaft engaging with the deflecting rollers. Specifically, the belt of the active modules can be configured as a toothed belt and the deflecting rollers of the active modules can have teeth for engaging with the toothed belt.

A drive motor can be provided, which is coupled to one row of modules or module row. The drive motor can be coupled for example by a drive belt to one of the shafts passing through the deflecting rollers. If active modules are present, the drive can be arranged at any desired place of the conveyor line.

Alternatively, a drive motor can be provided which is coupled to all the rows of modules or module rows, for example, with a chain running along the conveyor line and situated outside the conveyor line or a similar coupling means, such as a belt.

Specifically, the conveyor line can be mounted at the first and at the second end by means of preferably movable bearing blocks on a bracket or a frame. This can be done in particular by means of a further shaft or bearing shaft passing through the respective modules at the ends. In this way, the length of the conveyor line can be adjusted by simple moving of one or both bearing blocks in length.

BRIEF DESCRIPTION OF THE DRAWING

The present invention shall now be described in relation to a drawing having FIGS. 1-4, including the following:

FIG. 2 includes FIGS. 2A and 2B, where FIG. 2A shows the conveyor device from FIG. 1 in a partly extended position; and where FIG. 2B shows the conveyor device from FIG. 1 in a partly retracted position;

FIG. 3 includes FIGS. 3A, 3B, 3C and 3D having several views, each showing a module of the conveyor device from FIG. 1, including where FIG. 3A shows a top perspective view of a module of the conveyor device from FIG. 1, where FIG. 3B shows a top view of the module shown in FIG. 3A, where FIG. 3C shows a cross-sectional view of the module shown in FIG. 3B along lines B-B, and where FIG. 3D shows a side view of the module shown in FIG. 3B in relation to lines B-B; FIG. 4A shows a top view of the active module shown in FIG. 1, where FIG. 4B shows a cross-sectional view of the module shown in FIG. 4A along lines A-A, and where FIG. 4C shows a side view of the module shown in FIG. 4A in relation to lines A-A.

DETAILED DESCRIPTION OF THE BEST MODE OF THE INVENTION

Figure 1:
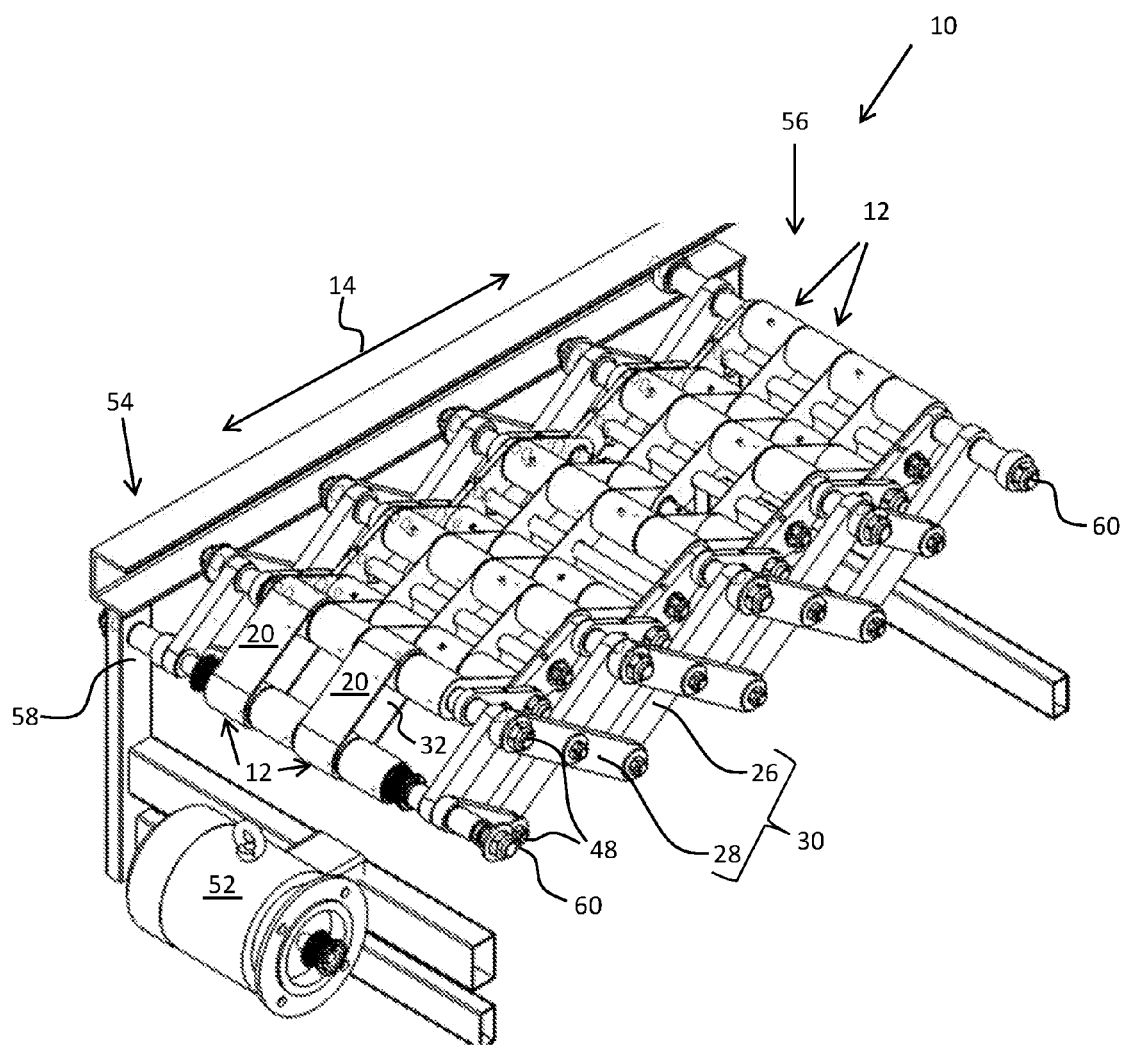
FIG. 1 shows an embodiment of the conveyor device according to the present invention.

FIG. 1 shows a conveyor device 10 for the transport of goods. The conveyor device comprises individual modules 12, which in their totality form a conveyor line 14. The modules 12 each have a belt 20 circulating between a start section 16 of the module 12 and an end section 18 of the module 12 (see FIGS. 3 and 4). The modules 12 are coupled together and can swivel against each other such that the conveyor line 14 can be adjusted in length by swiveling of the modules 12.

Within the conveyor line 14, several modules 12 are coupled together in chain fashion along the conveyor line 14. In the chainlike arrangement, each time one end section 18 of a module 12 is pivotally coupled to a start section 16 of another neighboring module 12.

The modules 12 can swivel out from a plane of the conveyor line 14, namely, a plane formed by the conveyor line 14. Thus, modules 12 neighboring or directly coupled to each other can be bent relative to each other, as can be seen in FIG. 2.

Figure 4:
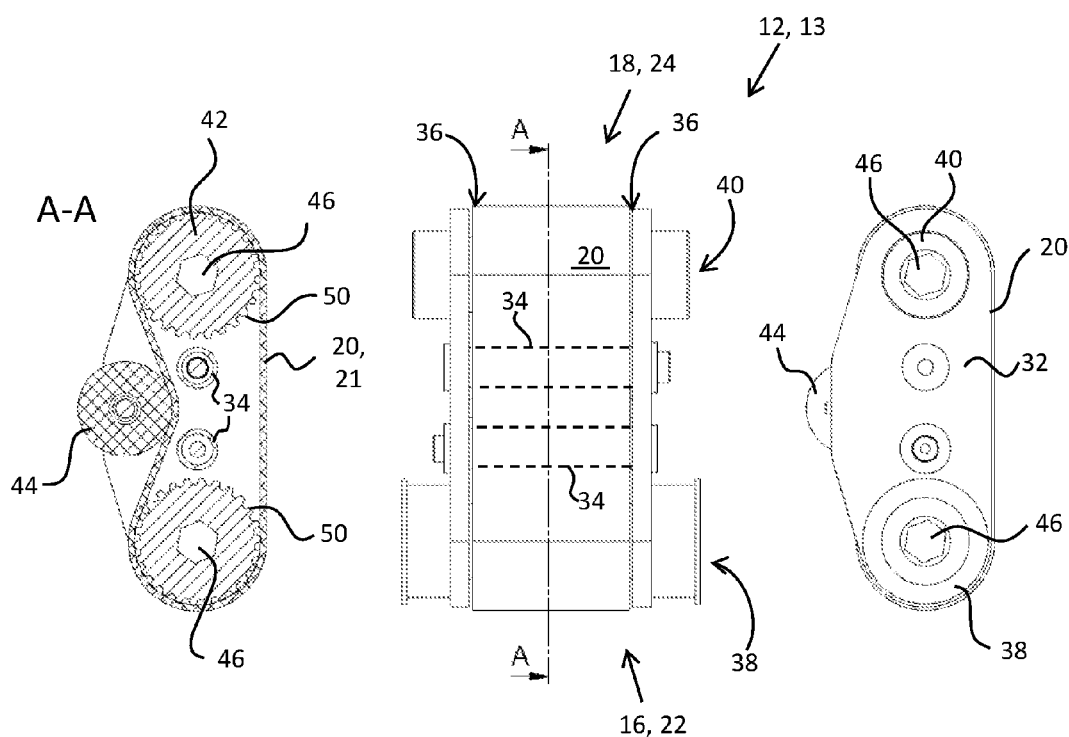
FIG. 4 includes FIGS. 4A, 4B and 4C having in several views, each showing an active module of the conveyor device from FIG. 1, including where

As is shown in FIGS. 3 and 4, the circulating belt 21 runs around a deflection 22 in the start section 16 and a deflection 24 in the end section 18.

The modules 12 are swiveled together by means of scissor elements 26, 28. Scissor elements 26, 28 form in their totality a scissor beam 30. In the sample embodiment represented, the scissor beam 30 is arranged on the outer side of the conveyor line 14. In embodiments not shown, the scissor beam can also be arranged inside the conveyor line 14.

The modules 12 are enclosed at the sides by side cheeks 32 (see FIG. 3). The side cheeks 32 furthermore prevent loose materials from wrapping around the belts 20 and in the worst case resulting in a disruption. The side cheeks 32 are spaced apart and secured for example by means of screw connections. The spacing of the side cheeks 32 is chosen such that an air gap 36 remains each time between belt 20 and side cheek 32. The side cheeks 32 are spaced apart from each other by means of sleeves 34.

Transversely to the lengthwise dimension of the conveyor line 14 several modules 12 are ranged alongside each other. The modules are staggered in consecutive rows of modules arranged along the conveyor line 14.

As can be seen in FIGS. 3 and 4, the modules 12 have a bush-shaped receptacle 38 on at least one side of an end and at the other end a barrel-shaped insert element 40 corresponding to the receptacle 38. If several modules are arranged against each other, the bush-shaped receptacle 38 and the barrel-shaped insert element 40 form a swivel axis.

The modules 12 each have two deflecting rollers 42, around which the belt 20 is led. Furthermore, each module 12 has a tension roller 44, with which the belt 20 of each module 12 can be individually tightened.

The deflecting rollers 42 have a passageway 46 each time, through which a shaft 48 is inserted (see FIG. 2), engaging by form fitting with the passageway 46. In this way, the deflecting rollers 42 of modules 12 arranged in a row are coupled together, so that the deflecting rollers 42 and thus for the most part also the belts 20 of the modules 12 arranged in this row turn in synchronization.

Some of the modules 12 are configured as active modules 13 for the driving of downstream modules 12 in the conveyor line (see FIG. 2). The active modules 13 transmit a drive movement or drive power from one row of modules to the next row. In addition, there are passive modules 15 which are driven by shafts 48 introduced into the deflecting rollers.

As shown in FIG. 4, the belt 20 of the active modules 13 is configured as a toothed belt 21 and the deflecting rollers 42 of the active modules 13 have teeth 50 for engagement with the toothed belt 21.

A drive motor 52 is provided for the drive propulsion, being coupled to a module 12, especially to one of the shafts 48 coupling the modules 12 (see FIG. 1). The coupling between motor and shaft is done by a drive belt (not shown).

The conveyor line 14 is mounted on a bracket 58 at the first end 54. At the second end 56, the conveyor line is mounted by means of a preferably movable bearing block (not shown) on the bracket or on the frame 58. The mounting can be done each time by means of a further shaft 60 or bearing shaft 60 passing through the modules. By moving the bearing block at the second end 56, the length of the conveyor line 14 can be adjusted.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. Conveyor device (10) for the transport of goods, comprising individual modules (12) which form in their entirety a conveyor line (14) and each have a circulating belt (20) circulating between a start section (16) of a respective module (12) and an end section (18) of the respective module (12), characterized in that the individual modules (12) are coupled together and able to swivel against each other so that the conveyor line (14) is adjustable in length by swiveling of the individual modules (12), wherein the circulating belt (20) runs around a deflection (22) in the start section (16) and a deflection (24) in the end section (18), and each individual module (12) is covered by the circulating belt (20) in the lengthwise direction so that each individual module (12) individually forms a belt conveyor, and wherein several of the individual modules (12) are arranged alongside each other transversely to the lengthwise dimension of the conveyor line (14) and staggered in the lengthwise direction of the conveyor line (14).

2. Conveyor device (10) according to claim 1, characterized in that every end section of a respective module (12) is coupled in a pivoting manner to a start section of a neighboring module (12).

3. Conveyor device (10) according to claim 2, characterized in that the modules (12) can swivel out from a plane of the conveyor line (14).

4. Conveyor device (10) according to claim 2, characterized in that the circulating belt (20) runs around a deflection (22) in the start section (16) and a deflection (24) in the end section (18).

5. Conveyor device (10) according to claim 2, characterized in that the modules (12) are pivoted together by means of scissor elements (26, 28).

6. Conveyor device (10) according to claim 2, characterized in that the modules (12) are enclosed at the side by side cheeks (32).

7. Conveyor device (10) according to claim 2, characterized in that several modules (12) are arranged alongside each other transversely to the lengthwise dimension of the conveyor line (14).

8. Conveyor device (10) according to claim 2, characterized in that the modules (12) have at least on one side of one end a bush-shaped receptacle (38) and have at the other end a barrel-shaped receptacle with an insert element (40) corresponding to the receptacle (38).

9. Conveyor device (10) according to claim 1, characterized in that the individual modules (12) can swivel out from a plane of the conveyor line (14).

10. Conveyor device (10) according to claim 1, characterized in that the individual modules (12) are pivoted together by means of scissor elements (26, 28).

11. Conveyor device (10) according to claim 1, characterized in that the individual modules (12) are enclosed at the side by side cheeks (32).

12. Conveyor device (10) according to claim 1, characterized in that the individual modules (12) have at least one side of one end a bush-shaped receptacle (38) and have at the other end a barrel-shaped insert element (40) corresponding to the bush-shaped receptacle (38).

13. Conveyor device (10) according to claim 1, characterized in that the individual modules (12) have two deflecting rollers (42) each time, around which the circulating belt (20) is led.

14. Conveyor device (10) according to claim 13, characterized in that the two deflecting rollers (42) each have a passageway (46) through which a shaft (48) is inserted, engaging the passageway (46) in a form fitting manner.

15. Conveyor device (10) according to claim 1, characterized in that some of the individual modules (12) can be configured as active modules (13) for the driving of downstream modules (12, 13) in the conveyor line (14).

16. Conveyor device (10) according to claim 15, characterized in that the circulating belt (20) of active modules (13) is configured as a toothed belt (21) and the two deflecting rollers (42) of the active modules (13) have teeth (50) for engaging with the toothed belt (21).

17. Conveyor device (10) according to claim 1, characterized in that a drive motor (52) is provided, which is coupled to one row of individual modules (12) having shafts (48) coupling the individual modules (12), including where the drive motor (52) is coupled to one of the shafts (48).

18. Conveyor device (10) according to claim 1, characterized in that the conveyor line (14) can be mounted at a first end (54) and/or at a second end (56) by means of movable bearing blocks on a bracket or a frame (58), including by means of a further shaft (60) passing through the individual modules (12).

* * * * *